(12) United States Patent
Katayama et al.

(10) Patent No.: US 6,641,069 B2
(45) Date of Patent: Nov. 4, 2003

(54) DRAG WASHER OF REEL FOR FISHING AND REEL FOR WASHING USING THE SAME

(75) Inventors: Hitoshi Katayama, Sakai (JP); Hiroshi Hasegawa, Sakai (JP); Teruhisa Kondo, Osaka (JP); Toshiki Kusuyama, Osaka (JP)

(73) Assignees: Shimano Inc,, Sakai (JP); Toyo Tanso Co., Ltd., Osaka (JP)

( * ) Notice: Subject to any disclaimer, the term of this patent is extended or adjusted under 35 U.S.C. 154(b) by 0 days.

(21) Appl. No.: 10/169,720

(22) PCT Filed: Jan. 15, 2001

(86) PCT No.: PCT/JP01/00207

§ 371 (c)(1),
(2), (4) Date: Jul. 11, 2002

(87) PCT Pub. No.: WO01/52645

PCT Pub. Date: Jul. 26, 2001

(65) Prior Publication Data

US 2003/0010856 A1 Jan. 16, 2003

(30) Foreign Application Priority Data

Jan. 19, 2000 (JP) .......................................... 2000-014045

(51) Int. Cl.$^7$ ................................................ A01K 89/02
(52) U.S. Cl. ...................................................... 242/246
(58) Field of Search ................................ 242/244, 245, 242/246, 264

(56) References Cited

U.S. PATENT DOCUMENTS

| 4,006,881 A | * | 2/1977 | Gaillard ....................... 251/214 |
| 5,681,497 A | * | 10/1997 | Labod ........................ 222/590 |
| 6,356,433 B1 | * | 3/2002 | Shi et al. ..................... 361/502 |

FOREIGN PATENT DOCUMENTS

| JP | 1-160442 | 6/1989 |
| JP | 2160891 | 6/1990 |
| JP | 10-276636 | 10/1998 |
| JP | 2000-4739 | 1/2000 |

* cited by examiner

Primary Examiner—Emmanuel M. Marcelo
(74) Attorney, Agent, or Firm—Oblon, Spivak, McClelland, Maier & Neustadt, P.C.

(57) ABSTRACT

A mixture comprising 40–80 mass % of expanded graphite, 5–25 mass % of heat-resistant reinforcing fiber and 10–40 mass % of heat-resistant binder is formed into a sheet form and then cured to form a sheet. The sheet is formed into a drag washer by punching, for application to a fishing reel's drag washer.

8 Claims, 9 Drawing Sheets

DRAG WASHER OF REEL FOR FISHING AND REEL FOR WASHING USING THE SAME

TECHNICAL FIELD

The present invention relates to a drag washer used for a drag mechanism of a fishing reel and to a fishing reel using the same.

BACKGROUND

In general, a drag mechanism of a fishing reel is given a setting of a braking force so that when a tensile force in excess of a predetermined value is exerted on a fishing line, the drag mechanism is made to slip to allow the fishing line to be reeled out in response to pull of hooked fish, so as to prevent the fishing line from being break. The drag washers that are generally used as braking friction plates in the drag mechanism include, for example, asbestos-phenol-resin molded material, flammable woven fabric greased or impregnated with oil grease, and carbon-fiber woven fabric impregnated with resin and cured.

These drag washers have the problems, however, that the friction resistance is subject to change under environmental changes, such as change in friction resistance caused by entrained seawater, change in friction resistance caused by frictional heat, and change in friction resistance resulting from durability in thickness direction against tightening force.

To eliminate these drawbacks of the conventional drag washers, graphite drag washers have been developed recently. The graphite drag washers have the advantages of being hardly subject to change in friction resistance under environmental changes and providing the excellent drag force for an extended time period.

However, in the producing process of the graphite drag washers, it is required that the drag washers are cut out into any desired size from some degree of size of graphite block by machining.

This causes increased costs in manufacturing the fishing reel using the graphite drag washers, leading to the disadvantage that the use of the graphite drag washers are limited to some high-grade goods. In addition, when used for general fishing, the graphite drag washers can produce excellent drag force and provide comfortable operation for an extended time period.

However, when the graphite drag washers are used to a large-sized fishing reel for marlin and large-sized fish, whose drag mechanism is given a setting of braking force of a relatively large value, there is the possibility that when a large braking force is exerted on the drag washers, the graphite drag washers may be cracked due to its own fragility that is one of the disadvantages of the graphite material.

It is the object of the present invention to provide a drag washer for a fishing reel that can provide a drag force equal to or more than that of the graphite drag washer for an extended time period, can be produced at reduced costs and without difficulty and is applicable to a variety of fishing reels for a variety of fish ranging from small-sized fish to large-sized fish.

DISCLOSURE OF THE INVENTION

The inventors have focused attention on an expanded graphite sheet having an excellent sliding property equivalent to that of the graphite material and have pursued their studies thereon with their whole heart. The conventional expanded graphite sheet has an excellent sliding property, but on the other hand, it lacks some required properties for the drag washer of fishing reel, such as strength and hardness. Due to this, it was practically infeasible to use the expanded graphite sheet for the drag washer of fishing reel.

The inventors have found that enhanced hardness can be produced by adding heat-resistant reinforcing fiber, such as fiber pulp, used as reinforcing material to the expanded graphite and then binding them by use of a heat-resistant binder such as thermosetting resin. Further, they have found the proportion in which three components, namely, expanded graphite, heat-resistant reinforcing fiber and heat-resistant binder, are mixed to produce a sheet having the required strength and sliding properties for the drag washer of fishing reel, then bringing the invention to completion.

A fishing reel's drag washer of the present invention is formed from a sheet comprising a mixture of expanded graphite and heat-resistant reinforcing fiber as is solidified by a heat-resistant binder. It is preferable that the sheet has a thickness of 0.7–1.2 mm and a bulk density of 0.8–1.2 $g/cm^3$. Also, the sheet is produced in such a process that 40–80 mass % of expanded graphite, 5–25 mass % of heat-resistant reinforcing fiber and 10–40 mass % of heat-resistant binder are mixed, followed by heat-treatment to cure the heat-resistant binder.

The expanded graphite used for the fishing reel's drag washer of the present invention is produced as follows. For example, flake graphite is subjected to acid treatment by using sulfuric acid and oxidizing agent to thereby produce acidized graphite, first, and then heated rapidly to approximately 1,000° C. so as to be expanded 100–300 times. Thereafter, the expanded graphite is ground in powdery form by using a granulator. Then, after the expanded graphite is formed into a felt form or a sheet form having a bulk density of 0.05–1.5 $g/cm^3$, the expanded graphite of felt form or sheet form is further ground in powdery form by using any proper high-speed mill type of grinder. Preferably, the powders of either of the felt and sheet have a bulk density of 0.05–1.5 $g/cm^3$ and a mean particle size of 150–250 $\mu$m. The expanded graphite ground into powdery form by the granulating method is easily delaminated, so that it is uniformly mixed with the heat-resistant reinforcing material and the heat-resistant binder with ease. The expanded graphite obtained when the felt of a bulk density of less than 0.05 $g/cm^3$ is ground becomes so bulky that it is hard to deal with. On the other hand, the expanded graphite obtained when the sheet of a bulk density of more than 1.5 $g/cm^3$ is ground is formed in the granular form, so that the characteristics of the expanded graphite itself are impaired.

Preferably, the heat-resistant reinforcing fiber is in a pulp form and have a large specific surface area, in terms of heat resistance as well as reinforcement of the expanded graphite powder. The fibers that may be used include inorganic fiber, organic fiber and metal fiber. Practically, the organic fiber that can take a relatively large specific surface area is preferably used. To be more specific, aramid fiber pulps of para-series or meta-series may be used. Also, infusible cellulose pulps may be used, though there is a limit to use.

The aramid fiber pulp of para-series used as the heat-resistant reinforcing fiber mentioned above is preferably 3.0 $m^2/g$ or more in specific surface area, or further preferably 5–20 $m^2/g$. The fiber length of 0.9–2.0 mm affords good dispersibility and high filler retention of 50–70%. The specific surface area of less than 3.0 $m^2/g$ is not good enough to provide the reinforcing effect of the expanded graphite and as a result, the strength of the sheet obtained is reduced.

Thermosetting resins are preferably used as the heat-resistant binder for bonding the expanded graphite and the heat-resistant reinforcing fiber. Particularly preferable are phenol resin, polyester resin, and epoxy resin. Among others, fine-grained phenol resin having a mean molecular weight of not less than 5,000 and a mean particle size of not more than 20 μm which affords excellent sliding properties is of preferable. This thermosetting resin is easily soluble in solvent and is able to be uniformly dispersed in between the expanded graphite powders and the fiber pulps.

For the purpose of enhancing the sliding properties, 4–5 mass % of molybdenum disulfide powder may be added as sliding material, if required. This enables the control of the sliding properties of the drag washer.

The sheet used for the fishing reel's drag washer of the present invention is produced by the respective materials cited above being mixed and then solidified. The respective materials are preferably mixed in a mixing proportion of 40–80 mass %, or preferably 50–70 mass %, of expanded graphite, 5–25 mass %, or preferably 10–20 mass %, of heat-resistant reinforcing fiber and 10–40 mass %, or preferably 20–30 mass %, of heat-resistant binder. Less than 40 mass % of expanded graphite would not produce the properties of the expanded graphite, while on the other hand, more than 80 mass % of expanded graphite would not develop the satisfactory strength. Less than 5 mass % of heat-resistant reinforcing fiber would not produce satisfactory heat resistance, while on the other hand, more than 25 mass % of heat-resistant reinforcing fiber would reduce dispersibility. Less than 10 mass % of heat-resistant binder would not develop the satisfactory slidability, while on the other hand, more than 40 mass % of heat-resistant binder would increase hardness and impair the properties of the expanded graphite. If required, 4–5 mass % of molybdenum disulfide powder may be added as sliding material.

The sheet used for the fishing reel's drag washer is made from the materials mixed in the mixing proportion mentioned above. The producing method is classified broadly into the dry process and the wet process. In the following, the dry process and the wet process will be described separately.

First, the producing method using the dry process will be described below.

The heat-resistant binder is previously dissolved in solvent such as methanol. Then, the heat resistant binder thus prepared, the heat-resistant reinforcing fiber and expanded graphite as previously mentioned are uniformly dispersed and mixed in any proper mixing machine such as a kneader. Then, the raw material thus mixed is fed to a calendar roll, that is an apparatus for producing a joint sheet and the like, and is rolled spread to uniform thickness to produce the sheet. When the raw material is wound around the heated calendar roll, the solvent in which the heat-resistant binder is dissolved is evaporated and also the heat-resistant binder is melted and solidified, to thereby produce a desired sheet.

Second, the producing method using the wet process will be described below.

In the wet process, the expanded graphite molded in felt form of a bulk density of 0.05–1.5 g/cm$^3$ is granulated by using a large amount of water and a mixer of hydro-pulper type and the like, though the powdery expanded graphite may be used. The heat-resistant reinforcing fiber is added thereto and is uniformly dispersed. This is passed through a refining mill to adjust the mean particle size of the expanded graphite to 180–230 μm. If the bulk density of the felt obtained at that time is less than 0.05 g/cm$^3$, the expanded gas in the void of the expanded graphite particles is not removed with ease and, as a result of this, the raw material is put into a floating state even when agitated and ground in water. On the other hand, if the bulk density of the felt obtained is more than 1.5 g/cm$^3$, the ground raw material is granulated and, as a result of this, the strength of the sheet is reduced. Then, the heat-resistant binder is added and is uniformly dispersed. When the heat-resistant binder is dispersed, anionic dispersing agent or NBR latex is preferably added, in order to provide improved dispersibility. Thereafter, aqueous solution of cationic flocculating agent is added to fix the heat-resistant binder completely. Preferably, the concentration of the raw material comprising expanded graphite, heat-resistant reinforcing fiber and heat-resistant binder dissolved in the mixed solution is 1.0–2.0%.

A prescribed amount of mixed solution, in which the raw material concentration of 1.0–2.0% comprising expanded graphite, heat-resistant reinforcing fiber and heat-resistant binder is dissolved, is poured into a tank having a wire cloth of a given size. Then, the mixed solution is diluted by an equal amount of water and is dispersed uniformly. Thereafter, it is dehydrated (dehydration process) to obtain a sheet of water content of 50–60%. Then, with the sheet sandwiched between felts, the sheet was compressed by a press, for further dehydration. Then, the sheet is put in an oven of 100–120° C. and dried therein. Thereafter, the sheet is passed through the calendar roll and heat-treated at 150–250° C. for 0.5–1.0 hour to cure the heat-resistant binder, so that the sheet is adjusted to 0.7–1.2 mm, or preferably 0.7–1.0 mm, in thickness and 0.8–1.2 g/cm$^3$ or preferably 0.9–1.1 g/cm$^3$, in bulk density. The sheet of a thickness of less than 0.7 mm would not develop satisfactory strength for the drag washer. On the other hand, the sheet of a thickness of more than 1.2 mm would provide an increased friction resistance, resulting in providing inadequate drag force. The sheet of a bulk density of less than 0.8 g/cm$^3$ would not develop satisfactory strength for the drag washer, as in the case of the thickness being reduced. On the other hand, the sheet of a bulk density of more than 1.2 g/cm$^3$ would undergo a lot of changes in coefficient of dynamic friction and the coefficient of friction would then be apt to increase with time and, as a result of this, the sheet could not be practically used as the drag washer for an extended time period. As a result of the bulk density being within this specific range, adequate voids are produced. When the drag washer formed from the sheet having this specific bulk density is fitted to a fishing reel, there is provided the advantage that when lubricant such as grease is applied to the drag washer, the lubricant is charged in the voids and, as a result of this, reduction in lubrication caused by permeation of water and sea water in the drag is prevented. It is to be noted that this process is suitable for production of a single piece of sheet.

In the case of producing a continuous sheet, a prescribed amount of mixed solution, in which the raw material concentration of 1.0–2.0% comprising the expanded graphite, the heat-resistant reinforcing fiber and the heat-resistant binder is dissolved, is poured into the tank. Then, the mixed solution is diluted by the equal amount of water and is dispersed uniformly. Thereafter, the suspension is passed through two double-wire screens and is dehydrated to obtain a sheet of water content of approximately 70%. Further, the obtained sheet is passed through a felt press, so as to be dehydrated to a water content of approximately 50% and, thereafter, it is passed through a multicylinder drier to be dried. Then, the sheet is passed through the calendar roll of room temperature and is so adjusted as to have a thickness of 0.7–1.2 mm, or preferably 0.7–1.0 mm, and a bulk density of 0.8–1.2 g/cm$^3$ or preferably 0.9–1.1 g/cm$^3$. When the sheet is passed through the calendar roll of room temperature, rather than through the heated calendar roll, increased surface roughness is provided, leading to enhancement of drag force. Thereafter, it is heat-treated in a drier of 150–250° C. for 0.5–1.0 hour to cure the heat-resistant binder and solidified.

The sheet thus produced is formed into any desirable size and shape by punching, to form the drag washers applicable to all types of fishing reels for a variety of fish ranging from a small-sized fish fishing reel to a large-sized fish. Also, the sheet thus produced enables the fishing reel's drag washer to be produced at reduced costs, as compared with the conventional material used for the drag washer.

BEST MODE FOR CARRYING OUT THE INVENTION

In the following, certain preferred embodiments of fishing reels employing the drag washers of the present invention will be described with reference to the accompanying drawings.

Figure 1:
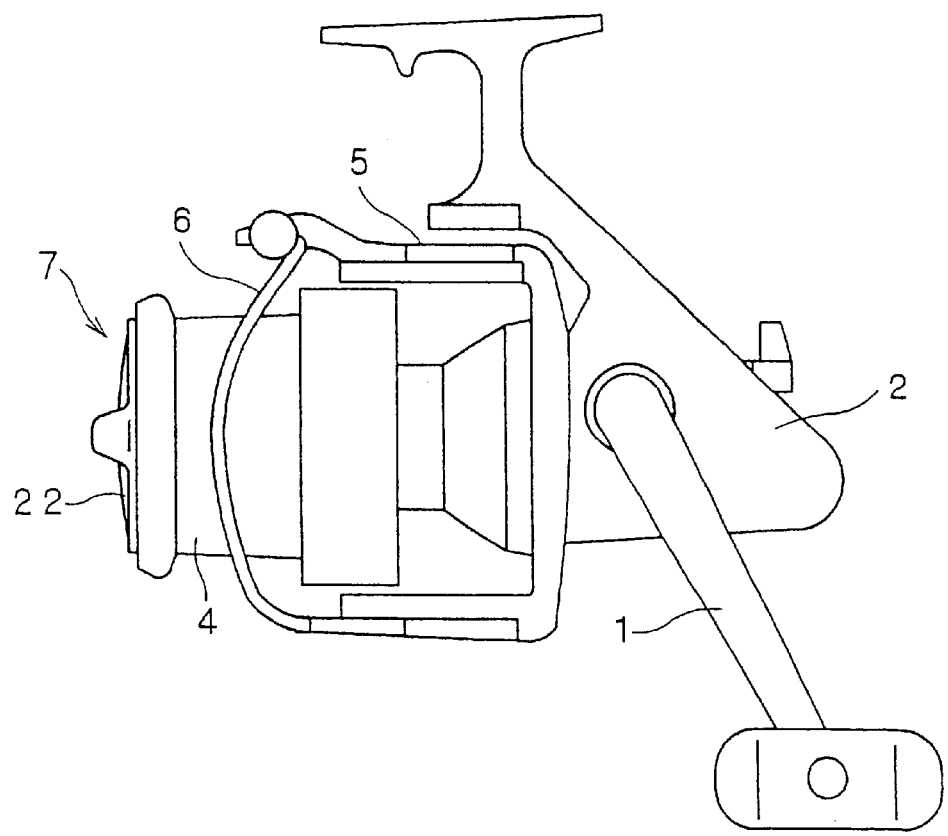
FIG. 1 is a side elevation view of a spinning reel of an embodiment employing drag washers of the present invention.
Figure 2:
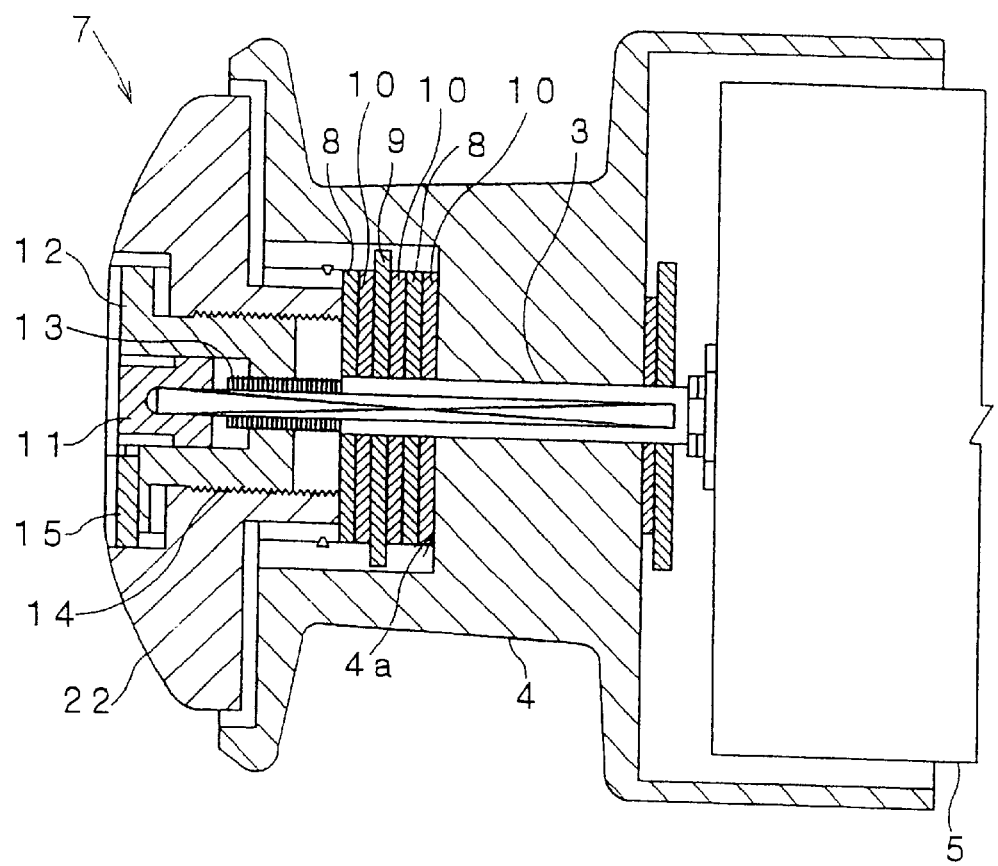
FIG. 2 is a side elevation view in section of a drag mechanism of a spinning reel of an embodiment employing the drag washers of the present invention.

Shown in FIG. 1 is an example of a spinning reel employing drag washers of the present invention. Shown in FIG. 2 is a side elevation view in section of a drag mechanism of the spinning reel of FIG. 1. In FIGS. 1 and 2, the spinning reel comprises a fishing line winding handle 1, a reel body 2 in which a winding power transmission system connecting with the fishing line winding handle 1 is disposed, a spool shaft 3 non-rotationally mounted on a front end of the reel body 2, a spool 4 mounted on the spool shaft 3 to be rotatable relative thereto, a rotary frame 5 that rotates around the spool 4, and a bail arm 6 mounted on the rotary frame 5.

The spool 4 has an inwardly recessed space formed at a front end portion thereof, in which a drag mechanism 7 for the spool 4 is disposed and a drag control member 22 that acts on the drag mechanism 7 to produce a drag force is disposed at the outside of the drag mechanism 7. The operation of the drag control member 22 exerts the drag force on the drag washers to variably control the rotation of the spool 4 of the fishing reel in a direction for a fishing line to be reeled out. The drag mechanisms 7 that may be used include, for example, a star-drag type one for adjusting the drag force by rotating operation of a star drag threadedly engaged with a handle shaft, a drag-lever type one for adjusting the drag force by swinging operation of a drag lever swingably mounted on the reel body, and a finger-nut-drag type one for adjusting the drag force by screwing a finger nut screwably engaged with the spool shaft.

In FIG. 2, the drag mechanism 7 comprises drag washers 8 mounted on the spool shaft 3 to be non-rotatable relative thereto and also freely slidable in an axial direction of the spool shaft 3, a drag washer 9 interposed between the drag washers 8 to be rotatable together with the spool 4, and drag washers 10 interposed between those drag washers 8, 9 and between the drag washer and a receiving wall 4a of the spool 4. Preferably, the drag washers of the present invention formed from a sheet comprising a mixture of expanded graphite and heat-resistant reinforcing fiber as is solidified by a heat-resistant binder is used for at least part of drag washers 8 to 10. Specifically, it is preferable that the drag washers of the present invention are used for the drag washers 10, and metal washers made of e.g. stainless alloy are used for the drag washers 8 and 9. Alternatively, the metal washers made of e.g. stainless alloy may be used for the drag washers 10, and the drag washers formed from the sheet of the present invention may be used for the drag washers 8 and 9. Further, the drag washers formed from the sheet of the present invention may be used for all the drag washers 8 to 10.

In the drag mechanism 7, the drag control member 22 is mounted, with its inner surface abutted with the drag washer. A fixing member 11 mounted on the spool shaft 3 and an intermediate moving member 12 freely rotatable and movable relative to the fixing member 11 are disposed in an inner space of the drag control member 22. The intermediate moving member 12 is provided, at a central portion thereof, with a first threaded portion 13 to threadedly engage with the spool shaft 3. Also, the intermediate moving member 12 is provided, at an intermediate portion thereof, with a second threaded portion 14 to threadedly engage with the drag control member 22. Preferably, the second threaded portion 14 is made larger in screw thread pitch than the first threaded portion 13, and vice versa.

The fixing member 11, the intermediate moving member 12 and the drag control member 22 are brought into the engagement state via a slide engaging pin 15 movable in a direction orthogonal to the axis of the spool shaft 3.

The slide engaging pin 15, when engaged with the drag control member 22 and the intermediate moving member 12, can allow the drag control member 22 and the intermediate moving member 12 to rotate together around the axis of the spool shaft 3, and as such can allow them to move along the axial direction of the spool shaft 3 by screw thread pitch of the first threaded portion 13. Also, the slide engaging pin 15, when moved ahead axially and engaged with the drag control member 22, the intermediate moving member 12 and the fixing member 11, can allow the intermediate moving member 22 to be fixed to the spool shaft 3 via the fixing member 11, and as such can allow the drag control member 22 to move relative to the intermediate moving member 12 by screw thread pitch of the second threaded portion 14. Thus, when the drag control member 22 is moved by the screw thread pitch of the second threaded portion 14, the movement of the drag control member 22 per unit operation can be made larger than when the drag control member 22 is moved by the screw thread pitch of the first threaded portion 13. This enables the drag force to be easily adjusted to any desired force for a target fish.

When the drag force is previously adjusted to a desired value for a target fish in this manner, the spool 3 is not rotated with a weak pull of hooked fish and thus the fishing line is not reeled out. On the other hand, when the pull of the hooked fish comes to be strong and a torque on the spool 3 increases, the torque transmitted goes beyond the preset value. As a result of this, slippage is caused between the drag washers 8–10 in the drag mechanism 7 and the spool 3 begins rotating. At this time, a fixed drag force is constantly exerted on the spool 3. When used in such a condition that a fixed drag force is exerted on the spool, the drag washers of the present invention formed from the sheet comprising a mixture of expanded graphite and heat-resistant reinforcing fiber as is solidified by a heat-resistant binder enables the fishing line to be reeled out very smoothly and, as a result, the possibility of line rupture can be reduced. In addition, by virtue of excellent thermal conductivity of the expanded graphite, deterioration in drag characteristic under temperature changes is suppressed even in a long-term use and a fixed drag force can be provided for an extended time period.

While in this embodiment, reference has been made to the spinning reel of front drag type, the present invention may be used as the drag washers of a spinning reel of rear drag type.

Other Embodiments

Figure 3:
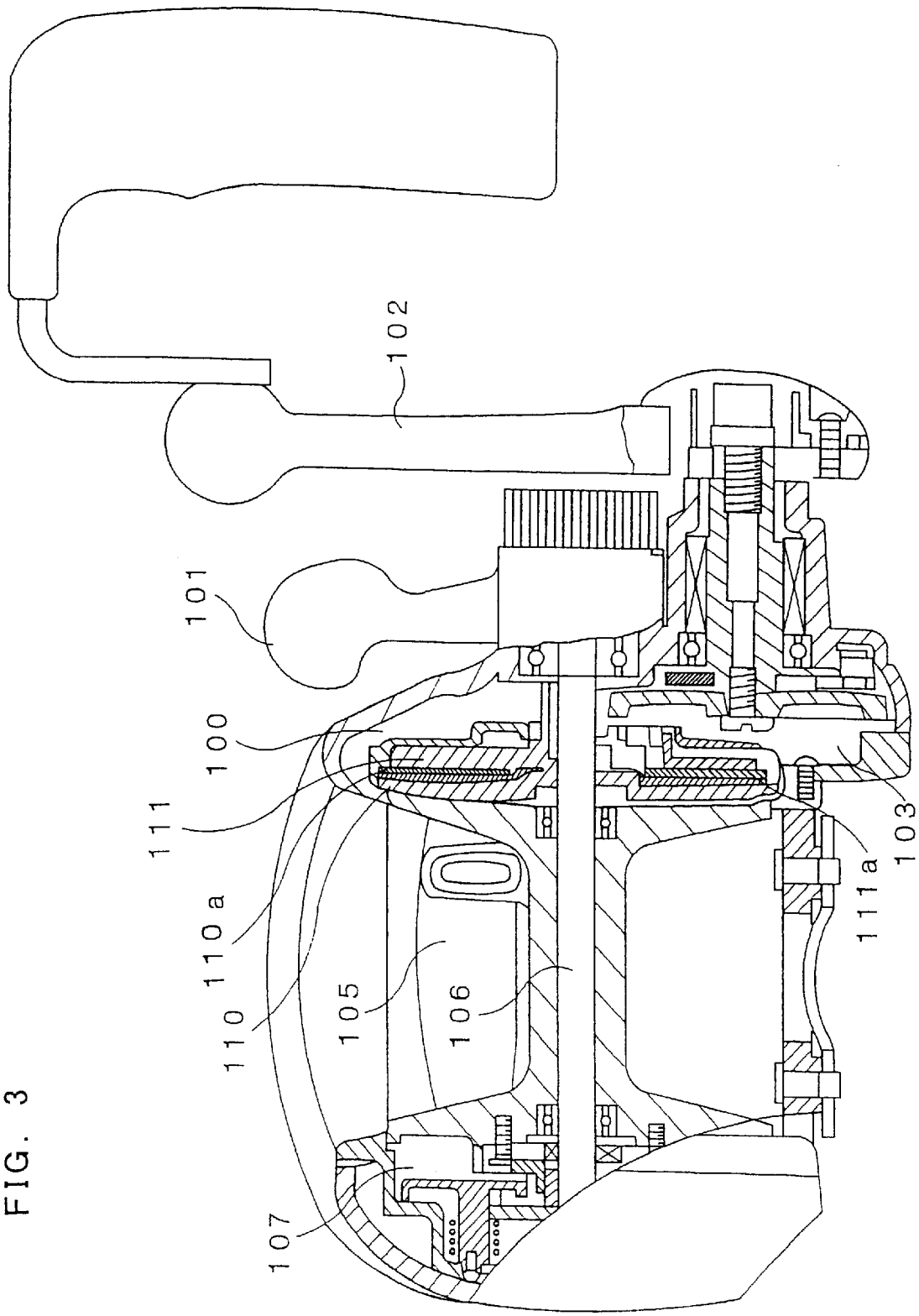
FIG. 3 is a side elevation view in section of a double bearing reel of a lever drag type of an embodiment employing the drag washers of the present invention.
Figure 4:
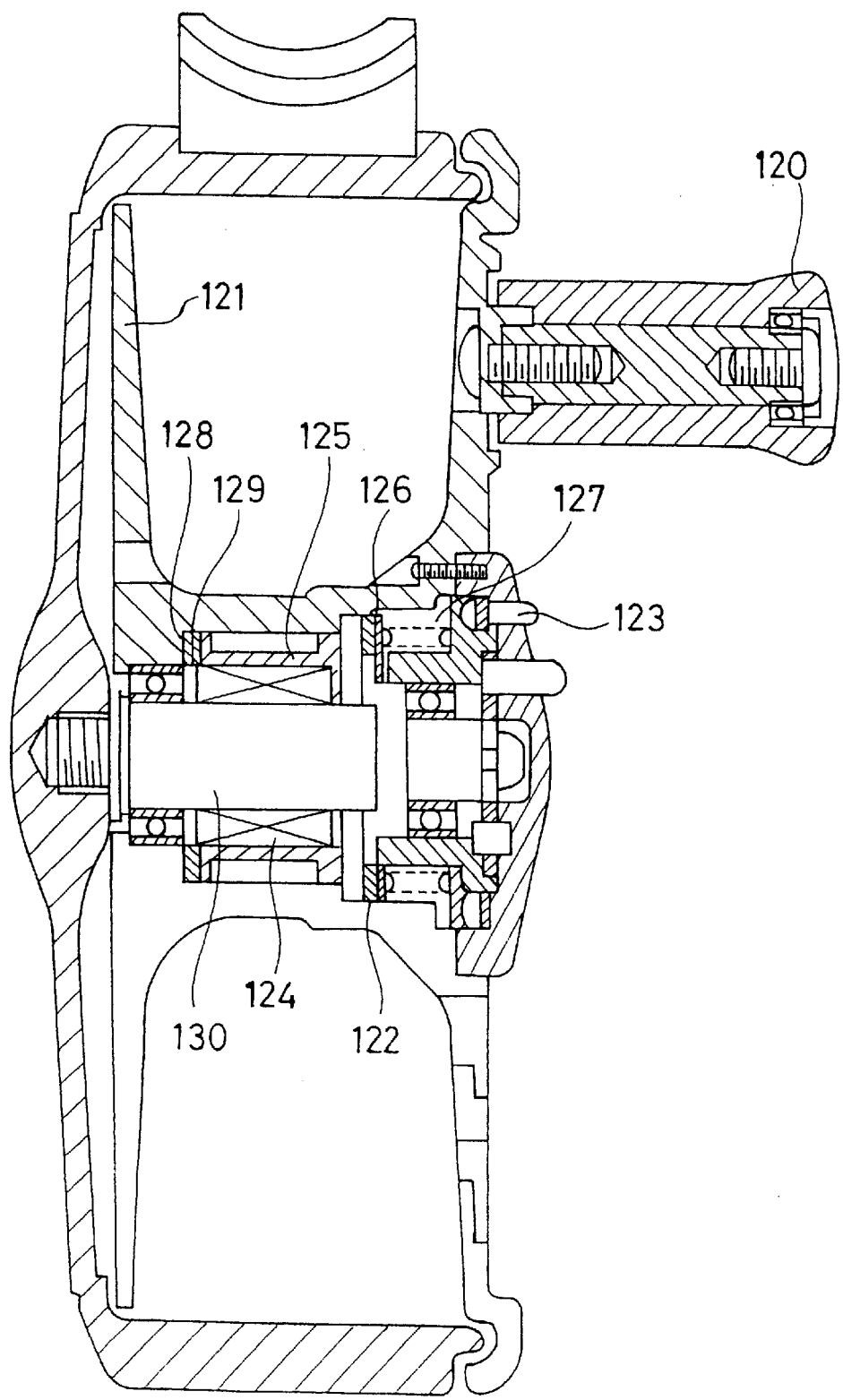
FIG. 4 is a side elevation view in section of a single bearing reel of an embodiment employing the drag washer of the present invention.

① While in the embodiment illustrated above, the spinning reel has been taken as an example, the present invention is applicable to all types of fishing reels having the drag mechanism, including, for example, a levered lug type double bearing reel as shown in FIG. 3 and a single bearing reel as shown in FIG. 4.

For example, in the levered lug type double bearing reel of FIG. 3, a spool 105 and a spool shaft 106 are connected with each other through a clutch mechanism 107.

In the drag mechanism 100 to put brake on the spool 105, swinging operation of a drag lever 101 causes an axial movement of the spool shaft 106 and thereby the drag force is adjusted. The drag mechanism 100 is arranged in the track of a rotation transmission mechanism 103 for transmitting the rotation of the handle 102. The drag mechanism 100 includes a first drag 110 mounted on the spool shaft 106 to be non-rotatable relative thereto and a second drag 111 connected with the rotation transmission mechanism 103. The rotation transmission mechanism 103 is restrained from rotating in the direction for the fishing line to be reeled out. The both drags 110, 111 are disposed to confront each other so that they can be press-contacted with each other. The drag lever 101, when operated, causes the first drag 110 to move axially together with the spool shaft 106. As a result of this, the press-contacting force of the first drag 110 with the second drag 111 varies and thereby the drag force is adjusted. Fixed to the first drag 110 in bonded relation is a drag washer 110a of the present invention formed from the sheet comprising a mixture of expanded graphite and heat-resistant reinforcing fiber as is solidified by a heat-resistant binder. Fixed to the second drag 111 in bonded relation is a drag washer 111a made of stainless alloy. The drag washer 111a confronts the drag washer 110a.

In the case of the drag mechanism 100 thus constructed, when the spool 105 is rotated in the line reel-out direction by a pull of hooked fish in excess of a preset drag force, the first drag 110 is rotated relative to the second drag 111 and, as a result of this, the effect equivalent to that of the embodiment mentioned above is produced.

In the case of the levered lug type of double bearing reel wherein a drag disc is directly fixed to the spool in bonded relation, the equivalent effect is produced.

In the single bearing reel of FIG. 4, a spool 121 is directly driven to rotate by the handle 120.

A drag mechanism 122 for putting brake on the spool 121 allows the drag force to be adjusted by swinging operation of a drag tab 123. The drag mechanism 122 is disposed in the interior of the spool 121. The drag mechanism 122 includes a tubular holder 125 connected with the spool shaft 130 via a one-way clutch 124, a drag washer 126, and a pressing mechanism 127 serving to press the drag washer 126. One end surface of the holder 125 is in contact with an inner end surface of the spool 121 via two washers 128, 129. The one-way clutch 124 permits the holder 125 to rotate in the line wind-up direction relative to the spool shaft 130, but restrains the holder to rotate in the line reel-out direction relative to the spool shaft. The drag washer 126 of the present invention is a ring-shaped member formed from the sheet comprising a mixture of expanded graphite and heat-resistant reinforcing fiber as is solidified by a heat-resistant binder. The drag washer 126 is disposed between the other end surface of the holder 125 and the pressing mechanism 127 in such a relation as to contact with both of them.

In this embodiment as well, when the fishing line is reeled out by hand or by a pull of hooked fish, the equivalent effect is produced.

Figure 5:
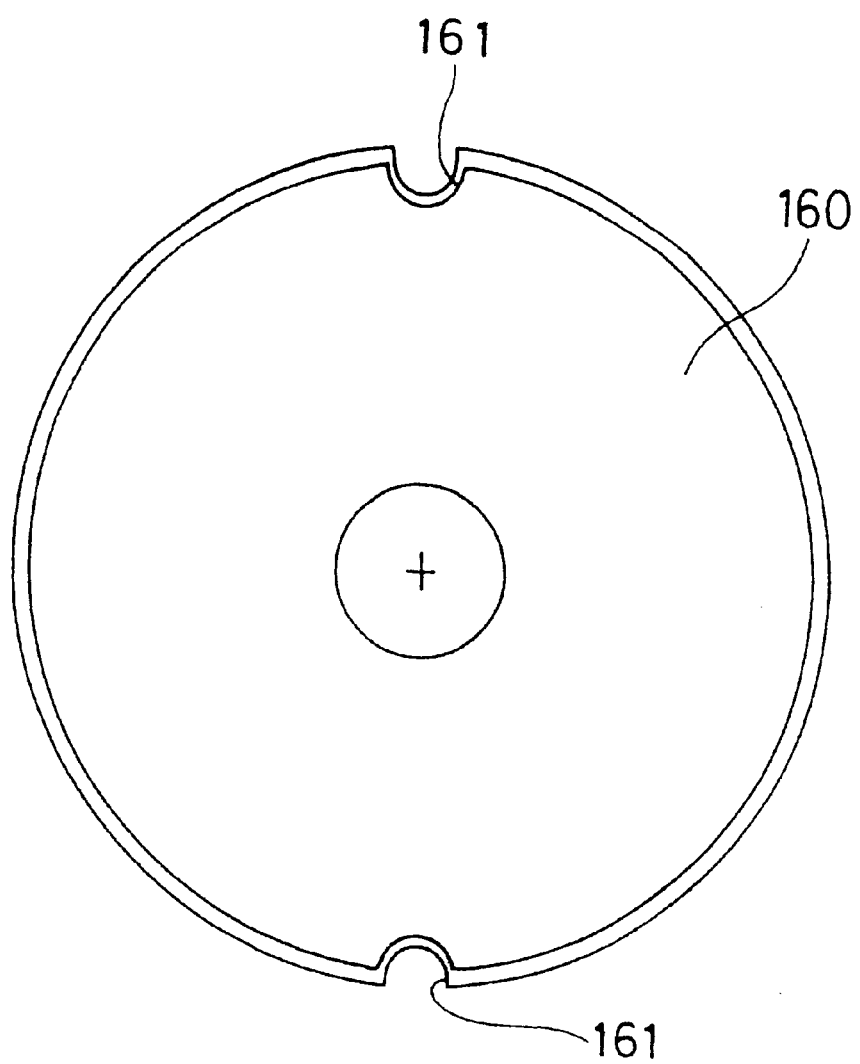
FIG. 5 shows an example of a variant of the drag washer of the present invention.
Figure 6:
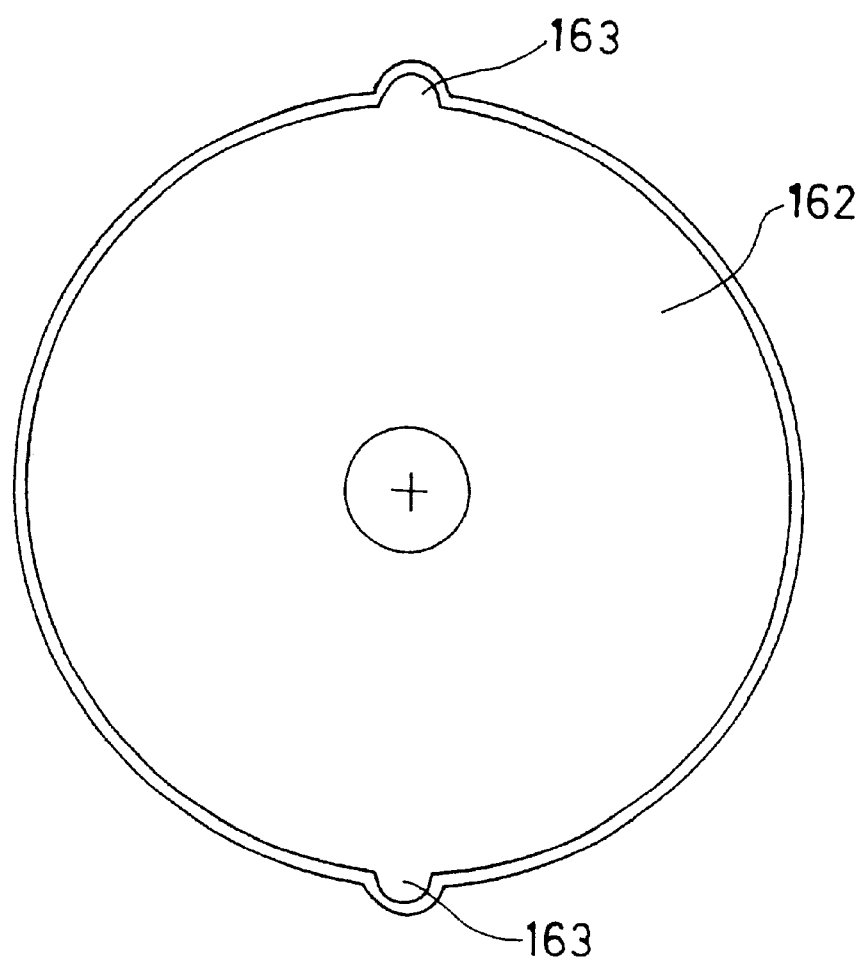
FIG. 6 shows an example of another variant of the drag washer of the present invention.

② In the embodiments illustrated above, the drag washer formed from the sheet comprising a mixture of expanded graphite and heat-resistant reinforcing fiber as is solidified by a heat-resistant binder is not provided with any detent. The drag washer 160 may be provided, along a periphery thereof, with detents formed by concavities 161 cooperative with the other member such as the spool, as shown in FIG. 5. The detents may alternatively be formed by lugs 163, as shown in FIG. 6. Since the sheet of the present invention comprising a mixture of expanded graphite and heat-resistant reinforcing fiber as is solidified by a heat-resistant binder can be punched out, those drag washer 160, 162 having the detents 161, 163 can be easily produced in accordance with various types of reels.

In the following, the properties of the drag washer of the present invention will be described concretely in accordance with Examples.

EXAMPLE 1

Vein graphite that was expanded two hundreds times was ground in powdered form of a bulk density of 0.08 g/cm$^3$ by use of a granulator. Then, 78 g of expanded graphite powder and 1,000 g of water were agitated for about ten minutes in a mixing machine, so as to be ground further finely. At this point in time, the expanded graphite powders were uniformly dispersed in the water and were put in suspension. Then, 20 g of aramid pulp used as heat-resistant reinforcing fiber was thrown into the mixing machine, together with 1,000 g of water, and agitated for 5–7 minutes, so that the aramid pulp was broken into flakes and also was uniformly dispersed in the water. The specific surface area of the aramid pulp used was 14 m²/g. They were uniformly mixed in a mixing tank and, as a result of this, the expanded graphite powders were aggregated in the aramid pulp. Further, in order for phenol resin powder having a mean molecular weight of not less than 5,000, used as the heat-resistant binder to bind the expanded graphite and the aramid pulp, to be easily mixed and dispersed, 10 g of NBR latex was added. Thereafter, 40 g of phenol resin powder was added and agitated for 3–4 minutes, so as to be uniformly suspended. Further, in order to fix the phenol resin in the aggregate of aramid pulp and expanded graphite, aqueous solution of cationic flocculating agent was added and stirred until the water becomes limpid, to obtain the mixed solution.

Then, after the mixed solution was poured into a tank having a bottom of 360×360 mm with a wire cloth an equal amount of water was further added to dilute the mixed solution so that the concentration of the expanded graphite, aramid pulp and phenol resin becomes approximately 0.5% and also disperse those materials uniformly in the mixture. Thereafter, it was dehydrated to obtain a sheet-like product. Further, the sheet-like product was dehydrated by a suction pump. Then, after having been sandwiched between felts, the sheet-like product was pressed by a press to be dehydrated and thereby the sheet was produced. The sheet thus produced was dried completely at 120° C. in a drier and then was passed through a calendar roll to adjust the sheet to 1.0 mm in thickness and 1.0 g/cm³ in bulk density. Then, to crosslink the phenol resin, the sheet was heat-treated at 200° C. for one hour and thereby the sheet used for the drag washer was produced. The drag washer sheet thus produced was the compressibility ratio of 17.5%, the recovery of 63.0%, and the relative roughness of 18–22 μm, when a tensile strength of 7.4 MPa and a compression stress of 35 MPa were applied to the sheet.

Comparative Test 1

Except that the sheet was adjusted to 0.6 mm in thickness and 1.3 g/cm³ in bulk density, the sheet was produced in the same manner as in Example 1 to obtain the sheet for the drag washer.

Discs of φ30 mm were cut out from the drag washer sheet of Example 1 and from that of Comparative Test 1, respectively. Then, the coefficient of dynamic friction of each disc was measured in the so-called pin-on-disc method in which a pin-shaped counterpart is pressed against the subject disc to measure the coefficient of dynamic friction of the disc. The measurements using the pin-on-disc method were made under the following conditions.

| Pin: | SUS 304 |
|---|---|
| Diameter of Pin: | 5 mm |
| Load: | 1 kg |
| Revolving speed: | 250 mm/s |
| Turning radius: | 12.6 mm |
| Time: | 3,600 s |
| Temperature: | Room temperature |

Figure 7:
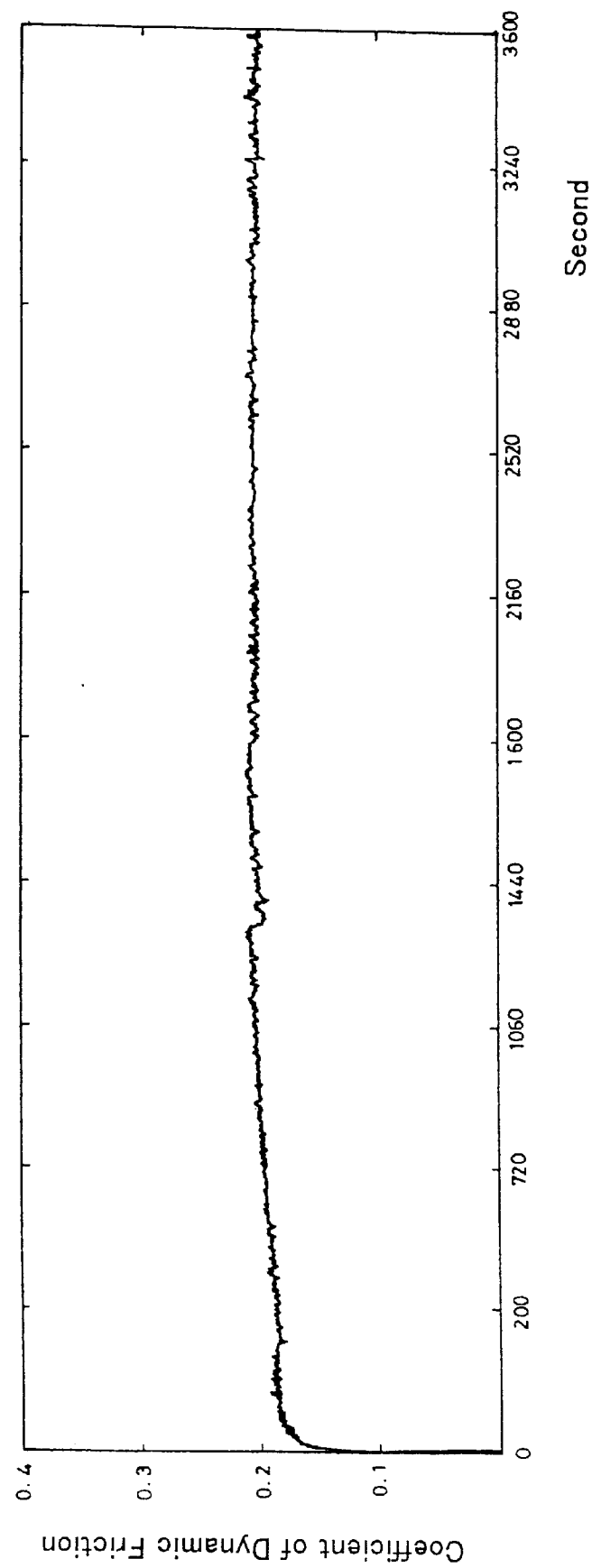
FIG. 7 shows a measurement result of coefficient of dynamic friction of the sheet of Example 1 of the present invention.
Figure 8:
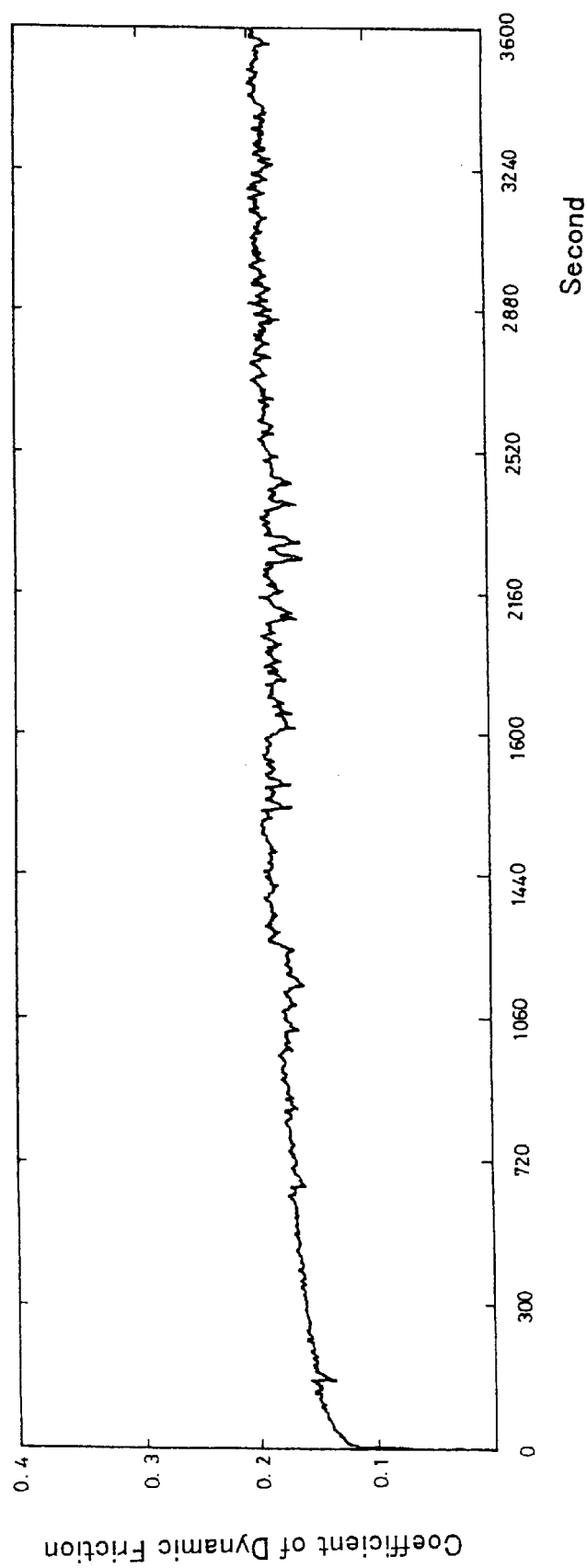
FIG. 8 shows a measurement result of coefficient of dynamic friction of the sheet of Comparative Test 1 of the present invention.

Measuring results of the coefficient of dynamic friction of the discs are shown in FIGS. 7 and 8. FIG. 7 shows the coefficient of dynamic friction of the test sample of Example 1, and FIG. 8 shows the coefficient of dynamic friction of the test sample of Comparative Test 1.

It can be seen from FIGS. 7 and 8 that the test sample of Comparative Test 1 undergoes a lot of changes in coefficient of dynamic friction. This indicates that when the disc of Comparative Test is used as the drag washer, the drag force varies with time.

Figure 9:
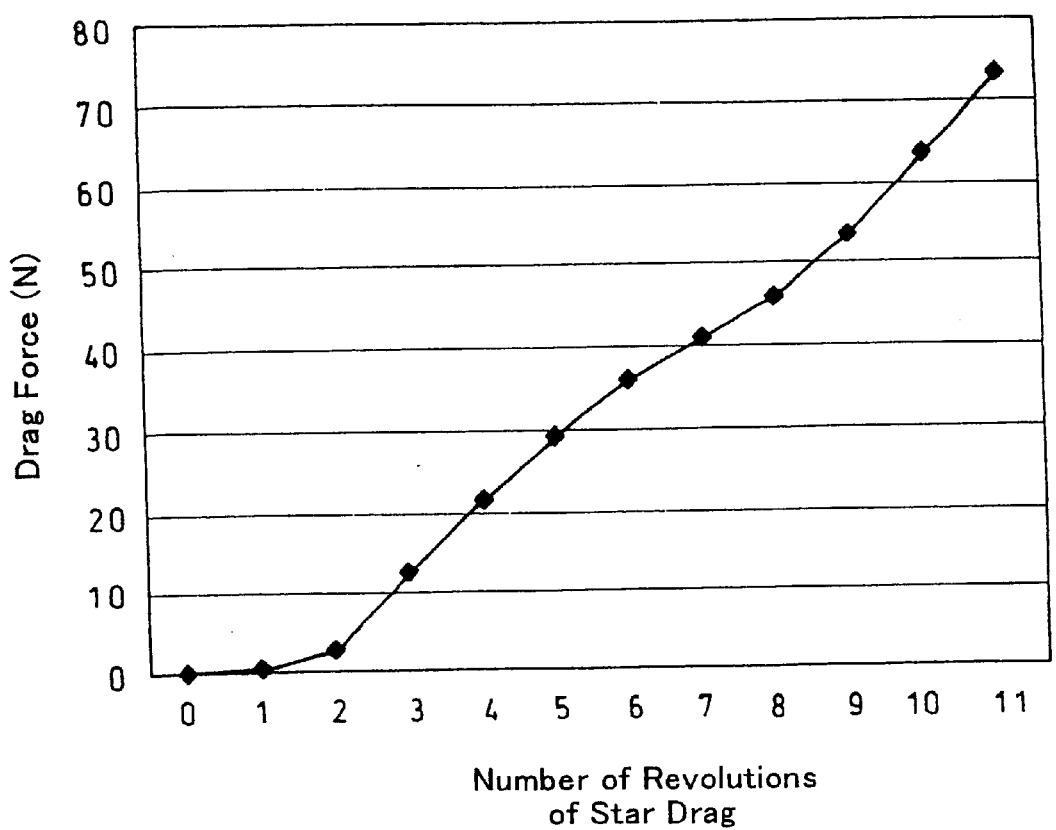
FIG. 9 shows the relation between the drag force of the drag washer formed from the sheet of Example 1 of the present invention and the number of revolutions of the star drag.

The test sample of Example 1 was actually fitted to the fishing reel, to find the drag tightening force, i.e., the relation between the number of revolution of the star drag and the drag force. The result is shown in FIG. 9. As seen from FIG. 9, the drag force of the drag washer according to the present invention increases substantially in proportion to the number of revolutions of the star drag. This indicates that the drag washer according to the present invention can afford fine adjustment of the drag force by rotational operation of the star drag, thus giving comfortable handling of the drag to an angler. Also, the drag force of the drag washer of the invention measured at that time was equal to or more than that of the conventional graphite drag washer. In addition, the result of the durability test in which the fishing line is paid out at a fixed tensile force at regular intervals showed that the durability of the drag washer of the invention was equal to or more than that of the conventional graphite drag washer. As seen from the foregoing, the drag washer according to the present invention provides the results of providing a generally constant coefficient of dynamic friction and keeping its drag (tightening) force and durability stable for an extended time period, thus giving comfortable handling of the drag to an angler for an extended time period.

Capabilities of Exploitation in Industry

The drag washer of a fishing reel of the present invention formed from the sheet comprising a mixture of expanded graphite and heat-resistant reinforcing fiber as is solidified by a heat-resistant binder is applicable to all type of fishing reels having the drag mechanism and can provide a generally constant coefficient of dynamic friction without being influenced by environments. Also, since the drag washer of the invention can be easily produced by punching, the manufacturing costs can be decreased drastically.

What is claimed is:

1. A fishing reel's drag washer formed from a sheet produced in such a process that 40–80 mass % of expanded graphite, 5–25 mass % of heat-resistant reinforcing fiber and 10–40 mass % of heat-resistant binder are mixed, followed by heat-treatment to cure the heat-resistant binder.

2. The fishing reel's drag washer according to claim 1, wherein the sheet has a bulk density of 0.8–1.2 g/cm³.

3. The fishing reel's drag washer according to claim 2, wherein the sheet has a thickness of 0.7–1.2 mm.

4. A fishing reel using the fishing reel's drag washer according to claim 3.

5. A fishing reel using the fishing reel's drag washer according to claim 2.

6. The fishing reel's drag washer according to claim 1, wherein the sheet has a thickness of 0.7–1.2 mm.

7. A fishing reel using the fishing reel's drag washer according to claim 6.

8. A fishing reel using the fishing reel's drag washer according to claim 1.

* * * * *